United States Patent
Gupta et al.

(10) Patent No.: US 8,627,325 B2
(45) Date of Patent: *Jan. 7, 2014

(54) SCHEDULING MEMORY USAGE OF A WORKLOAD

(75) Inventors: Chetan Kumar Gupta, Austin, TX (US); Abbay Mehta, Austin, TX (US); Umeshwar Dayal, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1114 days.

This patent is subject to a terminal disclaimer.

(21) Appl. No.: 12/258,226

(22) Filed: Oct. 24, 2008

(65) Prior Publication Data

US 2009/0178045 A1 Jul. 9, 2009

Related U.S. Application Data

(60) Provisional application No. 61/042,942, filed on Apr. 7, 2008, provisional application No. 61/010,132, filed on Jan. 3, 2008.

(51) Int. Cl.
*G06F 13/10* (2006.01)
(52) U.S. Cl.
USPC .......................................... 718/103; 718/105
(58) Field of Classification Search
None
See application file for complete search history.

(56) References Cited

U.S. PATENT DOCUMENTS

| | | | | |
|---|---|---|---|---|
| 3,411,139 A * | 11/1968 | Lynch et al. | | 710/1 |
| 5,881,284 A * | 3/1999 | Kubo | | 718/100 |
| 6,338,072 B1 * | 1/2002 | Durand et al. | | 718/104 |
| 6,353,844 B1 * | 3/2002 | Bitar et al. | | 718/102 |
| 6,763,519 B1 * | 7/2004 | McColl et al. | | 718/100 |
| 7,657,501 B1 * | 2/2010 | Brown et al. | | 707/999.002 |
| 7,664,561 B1 * | 2/2010 | Chen et al. | | 700/101 |
| 2002/0138679 A1 * | 9/2002 | Koning et al. | | 710/244 |
| 2005/0160074 A1 * | 7/2005 | Vos et al. | | 707/1 |
| 2005/0235289 A1 * | 10/2005 | Barillari et al. | | 718/100 |
| 2006/0206900 A1 * | 9/2006 | Ooyama et al. | | 718/105 |
| 2007/0100793 A1 * | 5/2007 | Brown et al. | | 707/2 |
| 2007/0106991 A1 * | 5/2007 | Yoo | | 718/103 |
| 2007/0169125 A1 * | 7/2007 | Qin | | 718/102 |
| 2007/0271570 A1 * | 11/2007 | Brown et al. | | 718/105 |
| 2008/0077932 A1 * | 3/2008 | Ruppach et al. | | 718/105 |

OTHER PUBLICATIONS

Brown et al. "Managing Memory to Meet Multiclass Workload Response Time Goals", Technical Report # 1146, Apr. 1993.*

* cited by examiner

*Primary Examiner* — Eric Coleman

(57) ABSTRACT

Described herein is a method for scheduling memory usage of a workload, the method comprising: receiving the workload, wherein the workload includes a plurality of jobs; determining a memory requirement to execute each of the plurality of jobs; arranging the plurality of jobs in an order of the memory requirements of the plurality of jobs such that the job with the largest memory requirement is at one end of the order and the job with the smallest memory requirement is at the other end of the order; assigning in order a unique priority to each of the plurality of jobs in accordance with the arranged order such that the job with the largest memory requirement is assigned the highest priority for execution and the job with the smallest memory requirement is assigned the lowest priority for execution; and executing the workload by concurrently executing the jobs in the workload in accordance with the arranged order of the plurality of jobs and the unique priority assigned to each of the plurality of jobs.

20 Claims, 4 Drawing Sheets

SCHEDULING MEMORY USAGE OF A WORKLOAD

CROSS-REFERENCE

This application is related to the following applications: U.S. Patent Application No. 61/042942, entitled, "MANAGING A WORKLOAD IN AN ELECTRONIC DATABASE," as filed on Apr. 7, 2008; U.S. Patent Application No. 61/010132, entitled, "PROCESSING BATCH DATABASE WORKLOAD WHILE AVOIDING OVERLOAD", as filed on Jan. 3, 2008. These applications are herein incorporated by reference in their entireties.

BACKGROUND

A computerized system such as a personal computer, a workstation, a server, and an electronic database, is often required to run, process, or execute a set of jobs, or a workload. A workload may include batch and incremental data load jobs, batch reporting jobs, and/or complex ad hoc querying jobs (for example, queries to a database). As the system is required to run more and larger workloads, memory contention arises and can cause severe degradation of system performance and destabilize the system. Thus, a key challenge to such a computerized system is to manage its workloads in order to meet stringent performance objectives for productivity enhancement. For example, there may be a desire to minimize the response time, that is, the duration of the execution, of a workload in the computerized system.

Accordingly, there is a desire to increase the performance of a computerized system by minimizing the response time of a system workload while maintaining the stability of the system so as to positively contribute to the workload management of the system.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

The response time of a workload running on a computerized system depends on a number of factors, including but are not limited to the number or type of jobs in the workload, the configuration of the computerized system, the number of concurrent jobs that can run in the system, etc. One metric of measuring the response time of a workload is throughput. The throughput is measured in jobs completed in a unit time. For example, in the context of a batch of queries, throughput is more concerned with the overall response time for a batch of queries rather than the individual response time of each query in the batch.

Figure 1:
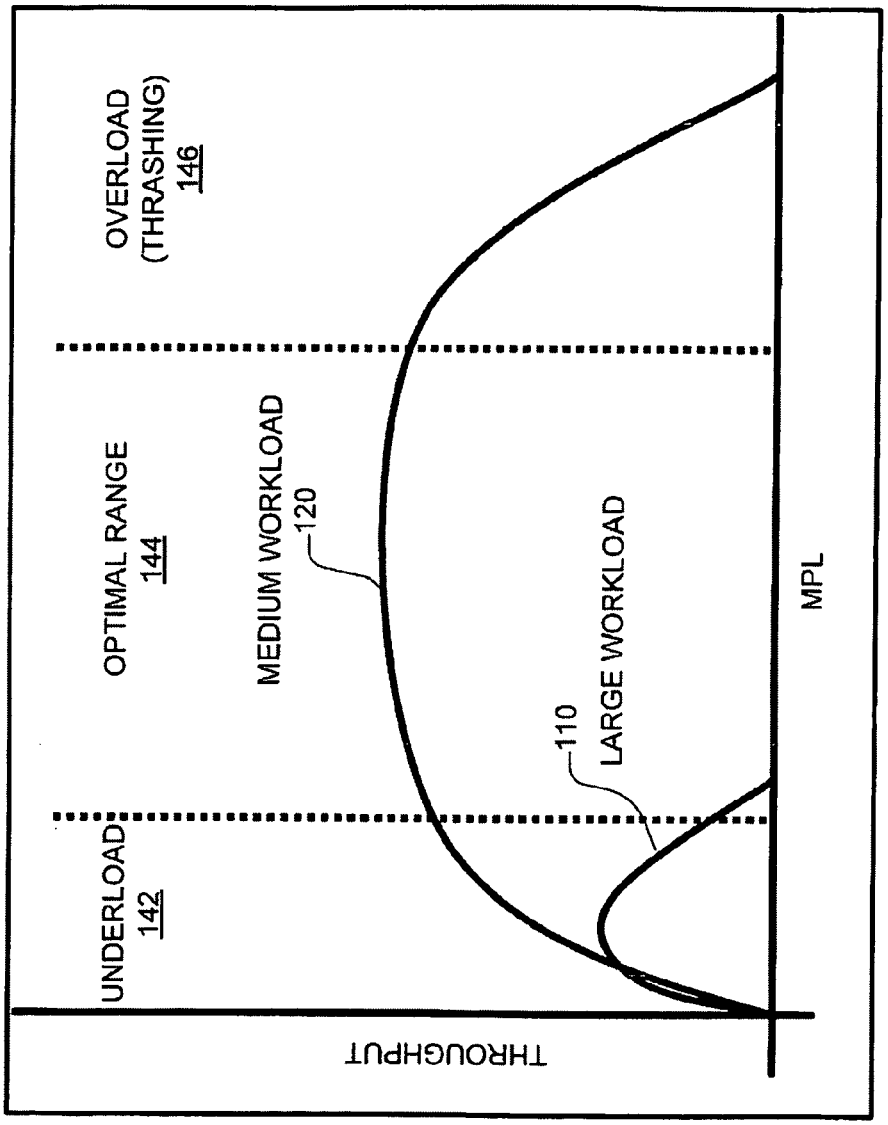
FIG. 1 illustrates a graph of throughput curves for different workloads to show optimum throughput desired to be achieved, in accordance with one embodiment.

One way of looking at throughput is with a throughput curve, wherein throughput is plotted against a "load" on a computerized system. Typically, a "load" is measured by measuring the number of jobs that can concurrently run on the system, also referred herein and understood in the art as multiprogramming level (MPL). MPL is also typically used as the manipulated variable of choice for workload management to control the load on the system. FIG. 1 illustrates a graph of throughput curves for two different workloads, a "large" workload (curve 110) that includes several large, resource intensive queries and a "medium" workload (curve 120) that includes several medium queries. In the graph, the x-axis is the multiprogramming level (MPL) and the y-axis is throughput. The throughput curves 110 and 120 may be divided into three regions. FIG. 1 illustrates these three regions for the throughput curve 120 of the medium workload: (i) the underload region 142 (where, by increasing MPL a higher throughput can be achieved), (ii) the optimal load region 144 (also known as saturation where by increasing MPL there is not much change in throughput), and (iii) the overload region 146 (where increasing MPL results in lower throughputs).

The overload or thrashing region 146 is considered as a serious problem for maintaining optimal throughput. A main cause of overload is memory contention, that is, the total memory requirement of the jobs in the workload is greater than the available memory on the system at any instance. Memory contention may be explained in the context of a global page replacement policy that replaces virtual memory pages (or memory frames in the case of physical memory) regardless of the process to which such pages belong. For example, when a job or process (such as a query) input to the EDW system requires more memory pages, it starts page faulting and taking away pages from other processes. Because these other processes also need those pages, they also fault and take pages from other processes. These faulting processes must use a paging device to swap pages in and out. As they queue up for the paging device, the ready queue empties. As processes wait for the paging device, the system CPU (central processing unit) utilization drops. The CPU has a scheduler that sees the decreasing CPU utilization and increases the number of jobs or processes. The new processes start by taking pages from the existing running processes, which further exacerbates the problem and CPU utilization drops further. As a result, the CPU executes more processes, and thrashing occurs with the throughput plunging significantly because the processes are spending all their time in page faulting.

Accordingly, described herein are methods and systems for scheduling memory usage by one or more workloads in a computerized system to offset possible memory thrashing. According to various embodiments described herein, ordering of jobs in workloads and memory prioritization for such jobs are used for memory scheduling. This extends the optimal region of a workload throughput in order to eliminate or at least minimize thrashing or overload that can cause system destabilization. Consequently, these memory prioritization embodiments may be employed for workload management of computerized systems or for increasing throughput of applications that have extensive system memory requirement or require frequent access to system memory.

In one embodiment, an ordering policy is applied to an incoming workload to a computerized system, such as an enterprise data warehouse, which may include one or more electrical or electronic data storage devices such as computers, servers, computer databases, and the like. The ordering policy arranges the jobs in the workload in an order based on a predetermined ordering function $F_{ord}$, so as to stabilize the system for memory contention while maintaining throughput in the optimal region. Then, a unique priority is given to each job in the workload in accordance with the order in which it was arranged by the ordering policy.

Typically, an ordering scheme is employed without priority awareness, wherein the ordering of jobs is implemented by having a time lag between the start time of the jobs. For example, a first job $J_1$ is set to start (that is, to be executed by the system) at time $t_1$, then a second job $J_2$ is set to start at time $t_2=t_1+\cdot$, where $\cdot>0$ and so on to the last job of the workload. However, such a typical ordering scheme can lead to a loss in throughput because the system may not get into the optimal region 144 until some job $J_m$ has been started. Thus, from time $t_1$ to $t_m$, the system is underloaded in the region 142. In another example, an ordering scheme is based on a first-come, first-serve basis, wherein each of the jobs $J_1 \ldots J_n$ is started when it is received by the system. Thus, there is no priority awareness among the jobs. This also leads to a loss of throughput. As referred herein, an ordering scheme of jobs in a workload, with or without priority awareness, does not denote that the jobs are executed serially with one starting only after another is finished. Rather, the ordering scheme of jobs denote the order in which the jobs are started. Once the jobs are started, they are concurrently executed in a pipeline or interleaving manner in accordance with the order in which they started.

In a priority aware setting as described herein, all jobs in the workload are concurrently started in the system at time $t_0$. However, an ordering scheme is imposed on the jobs, and a unique priority is assigned to each job based on the ordering scheme. Job prioritization is based on memory usage requirement for each job as applied to the ordering scheme. In one embodiment, highest priority is assigned to the job with the largest (that is, highest) memory requirement, next highest priority is assigned to the job with the next largest memory requirement, and so, to the lowest priority assignment to the job with the lowest memory requirement. In instances where a workload may be divided into batches of jobs for batch execution, the aforementioned ordering scheme and job prioritization are applied to each batch for execution in the system.

Figure 2:
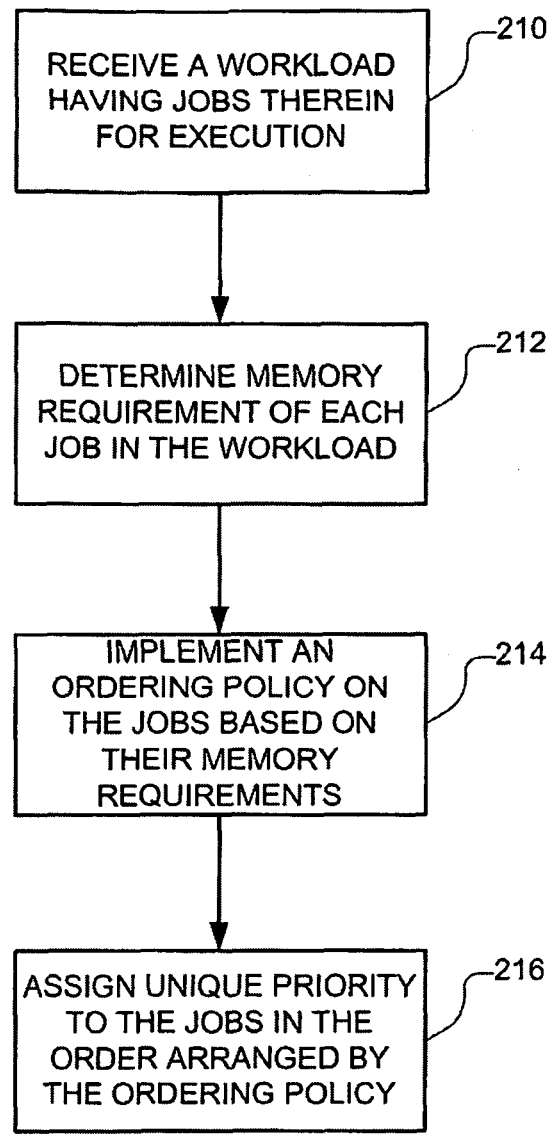
FIG. 2 illustrates a largest memory priority (LMP) process, in accordance with one embodiment.

FIG. 2 illustrates a largest memory requirement (LMP) process 200 for ordering and prioritizing jobs in a workload (or in a batch of workload) in accordance with largest memory requirements for the jobs, whereby all jobs in the workload may be started together at a time $t_0$ for execution in a computerized system, in accordance with one embodiment.

At 210, the computerized system receives a workload having a plurality of jobs for execution. The workload may be further divided into batches of jobs within the system or prior to reception of such batches at the computerized system. For simplicity, the LMP process 200 is further described with reference to ordering and prioritizing jobs in a workload that is not further divided into batches. However, it should be understood that such a description is also applicable to ordering and prioritizing jobs in each batch of the workload.

At 212, the computerized system determines the memory requirement of each job, that is, the memory required of the computerized system to effectively execute or run the job. This determination is commonly known in the art and will not be described herein.

At 214, based on the determination at 212, an ordering policy is implemented by the computerized system, wherein the jobs are arranged in descending order of memory requirement $m_i$ such that:

$$m_i \cdot m_{i+1}, i \cdot [1 \ldots n],$$

and the jobs are ordered as $J_1, J_2, J_3, \ldots, J_n \cdot W$ (jobs $J_1 \ldots J_n$ belong to workload W), with job $J_1$ being the first job in the order because it has the largest memory requirement, job $J_n$ being the last job in the order because it has the lowest memory requirement, and jobs in between arranged in descending order in accordance with their corresponding memory requirements. Alternatively embodiments are contemplated wherein the jobs are arranged in ascending order of memory requirement. That is, the jobs may be arranged in ascending or descending order so long as they are arranged in the order of their memory requirements.

At 216, a unique priority is assigned in order to each of the jobs as arranged in the order at 214. That is, job $J_1$ is assigned the highest priority $P_1$, job $J_2$ is assigned the second highest priority $P_2$, and so on until all jobs $J_j \cdot W$ are assigned unique priorities.

Figure 3:
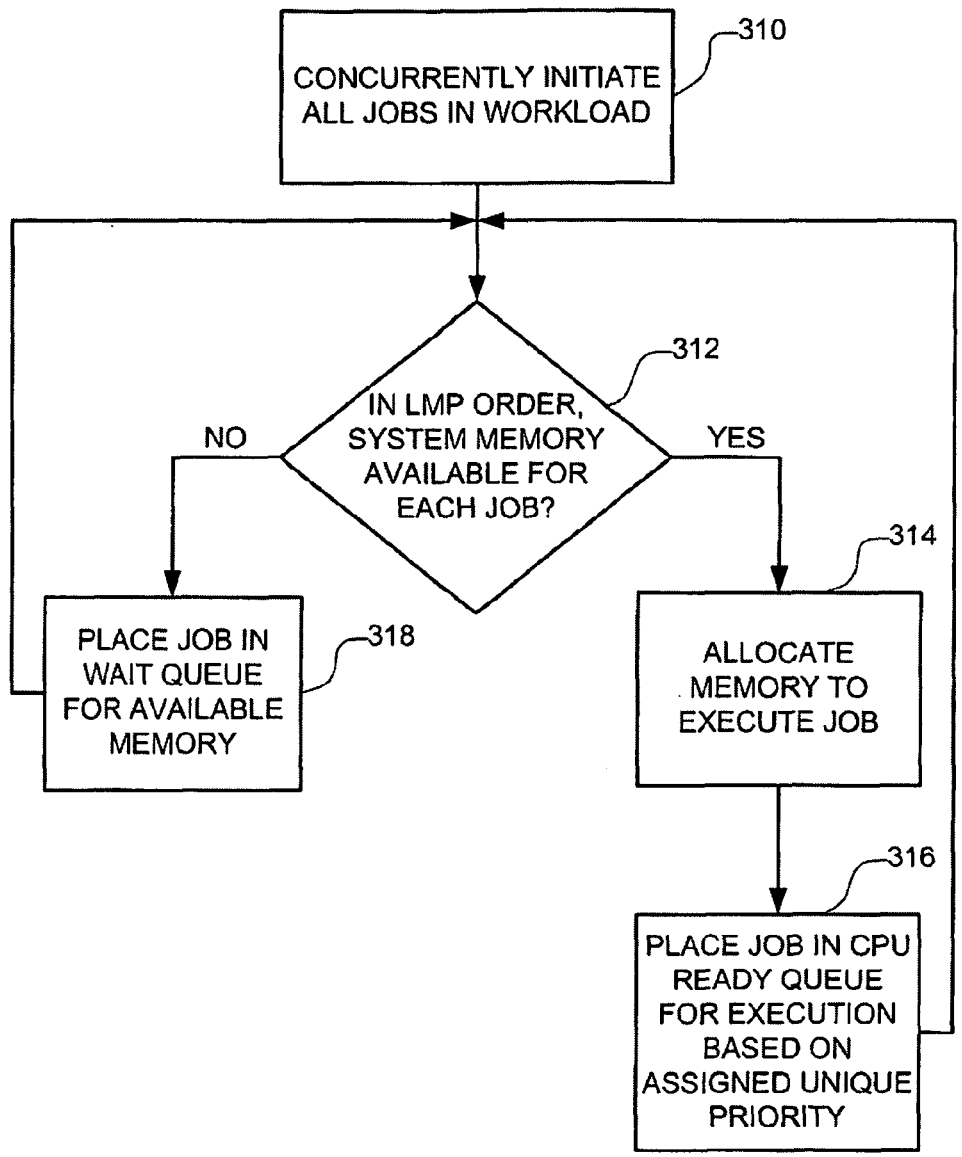
FIG. 3 illustrates an execution of a workload in accordance with the LMP process, in accordance with one embodiment.

FIG. 3 illustrates a process 300 for starting all the jobs in a workload together at time $t_0$ based on the LMP process 200, in accordance with one embodiment.

At 310, all jobs $J_1 \ldots J_n$ in the workload are started or initiated at time $t_0$ for execution by the computerized system, particularly by one or more CPUs in the computerized system.

At 312, in the order provided by the LMP process 200, the computerized system determines whether there is available system memory to continue executing each of the jobs. For example, it is first determined whether there is available system memory to execute job $J_1$, then $J_2$, then $J_3$, and so on to $J_n$. The availability of the system memory depends on known factors such as how much memory resources (for example, random access memory or CPU cache memory) the system has for job execution and the number of jobs are currently being executed by the system.

At 314, if there is available system memory for one or more jobs, the system memory is allocated to execute such job(s). It should be noted that the allocation of system memory is based on the ordering of the jobs. For example, if system memory is available to execute job $J_1$, the remaining system memory after memory allocation to $J_1$ is used for job $J_2$. Only when the remaining system memory is not sufficient to execute job $J_2$, will such remaining memory be used for job $J_3$, and so on. The same applies for the remaining system memory after, for example, memory has been allocated to execute, for example, both $J_1$ and $J_2$ (if enough system memory is available for both).

At 316, those jobs with allocated system memory are placed in the CPU ready queue for execution by one or more CPUs in the computerized system. If any of the jobs in the ready queue has a higher priority than the present job that the CPU(s) is executing, it pre-empts or trumps the present job, whereby the CPU releases the present job to the ready queue and completes the higher-priority job before it goes back to complete the present job (unless, of course, there exists another higher-priority job in the CPU ready queue).

At 318, if there is not available system memory for any of the jobs, they are placed in a CPU wait queue until system memory becomes available for them. As with the execution of jobs in the CPU ready queue, memory allocation for the jobs in the wait queue are also based on their assigned priorities. For example, if jobs J1, J3, and J7 are placed in the wait queue, any available system memory is applied to J1 before J3. That is, only when the available system memory is not sufficient for J1, will such memory be applied to J3, and then to J7. Likewise, if the available system memory is sufficient for J1 with some remaining memory for another job, that remaining memory is applied to J3 before J7.

Accordingly, the LMP process alleviates memory contention in a computerized system during execution of workloads by assigning the higher priorities for system execution to those workload jobs that require higher (that is, larger) system memory requirement. Because higher-priority jobs are executed earlier, they are amongst the earliest to complete and release their memories. This eases memory pressure on the system to reduce memory contention, which then averts a system thrashing.

Figure 4:
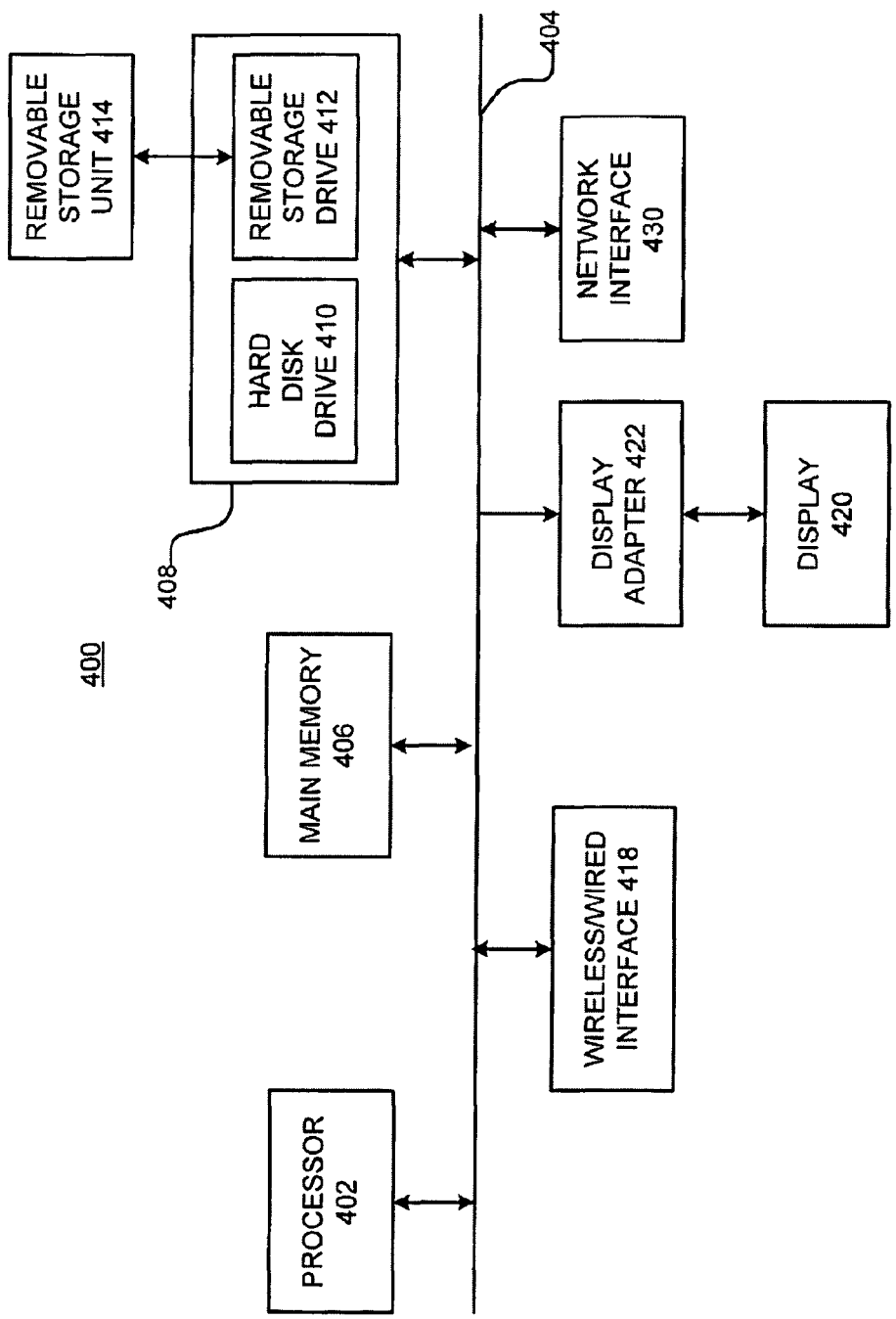
FIG. 4 illustrates a platform in which the LMP process and execution of workloads may be implemented, in accordance with one embodiment.

FIG. 4 illustrates a block diagram of a computerized system 400 that is operable to be used as a platform for implementing the aforementioned LMP process 200 and the job execution process 300 for running workloads therein or in a separate computerized system, such as in an enterprise data warehouse, that is accessible to the computerized system 400.

The computerized system 400 includes one or more processors, such as processor 402, providing an execution platform for executing software and workloads. Thus, the computerized system 400 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 402 are communicated over a communication bus 404 or through point-to-point links with other components in the computer system 400.

The computer system 400 also includes a main memory 406 where software is resident during runtime, and a secondary memory 408. Thus, the main memory 408 may be used to provide the available memory for executing workloads as discussed in the process 300. The secondary memory 408 may also be a computer-readable medium (CRM) that may be used to store software programs, applications, or modules that implement the processes 200 and 300 to execute workloads in the computerized system 400 or an external system as noted above. The main memory 406 and secondary memory 408 (and an optional removable storage unit 414) each includes, for example, a hard disk drive 410 and/or a removable storage drive 412 representing a floppy diskette drive, a magnetic tape drive, a compact disk drive, etc., or a nonvolatile memory where a copy of the software is stored. In one example, the secondary memory 408 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The computer system 400 includes a display 420 connected via a display adapter 422, user interfaces comprising one or more input devices 418, such as a keyboard, a mouse, a stylus, and the like. However, the input devices 418 and the display 420 are optional. A network interface 430 is provided for communicating with other computer systems via, for example, a network.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for scheduling memory usage of a workload, comprising:
    receiving the workload, wherein the workload includes a plurality of jobs;
    determining a memory requirement to execute each of the plurality of jobs;
    arranging the plurality of jobs in an order of the memory requirements of the plurality of jobs such that the job with the largest memory requirement is at one end of the order and the job with the smallest memory requirement is at the other end of the order;
    assigning a unique priority to each of the plurality of jobs in accordance with the arranged order such that the job with a largest memory requirement is assigned the highest priority for execution and the job with the smallest memory requirement is assigned the lowest priority for execution, wherein each assigned unique priority is different from any other of the assigned unique priorities; and
    executing the workload in accordance with the arranged order of the plurality of jobs and the unique priority assigned to each of the plurality of jobs, from highest to lowest priority.

2. The method of claim 1, wherein receiving the workload comprises:
    receiving the workload as one of a plurality of batches of jobs divided from a larger workload.

3. The method of claim 1, wherein executing the workload comprises:
    concurrently initiating execution of the plurality of jobs; and
    determining, in the arranged order of the plurality of jobs, whether there is available memory to execute each of the plurality of jobs based on a memory requirement of each job.

4. The method of claim 3, wherein executing the workload further comprises:
    upon determining that there is available memory to execute one of the plurality of jobs,
        a) allocating a first memory from the available memory to execute the one job; and
        b) determining whether a remainder of the available memory after the allocation of the first memory is sufficient to execute another one of the plurality of jobs.

5. The method of claim 4, wherein executing the workload further comprises:
    upon determining that there is available memory to execute one of the plurality of jobs, determining whether the assigned unique priority of the one job is higher than the assigned unique priority of a current job being executed; and
    upon determining that the assigned unique priority of the one job is higher than the assigned unique priority of the current job, ceasing the execution of the current job in order to execute the one job.

6. The method of claim 5, further comprising:
  releasing the first memory allocated to the one job once execution of the one job is complete; and
  returning the first memory as part of the available memory to execute one of the plurality of jobs.

7. The method of claim 3, wherein executing the workload further comprises:
  upon determining that there is not available memory to execute one of the plurality of jobs, placing the one job in a waiting queue until there is available memory to execute the one job.

8. The method of claim 7, wherein executing the workload further comprises:
  once there is available memory to execute the one job in the waiting queue, allocating the available memory to execute the one job in the waiting queue with respect to other jobs in an order of the assigned unique priorities of the plurality of jobs such that a job with a higher priority in the waiting queue is given priority to use the available memory before a job with a lower priority.

9. The method of claim 1, wherein the plurality of jobs comprise a plurality queries to an electronic database.

10. A computerized system for executing a workload therein, wherein the workload includes a plurality of jobs to be executed, the computerized system comprises:
  a processor to execute the workload;
  a first memory storage device to execute the workload; and
  a second memory storage device to provide instructions to the processor to:
    determine a memory requirement of each of the plurality of jobs;
    arrange the plurality of jobs in an order of the memory requirements of the plurality of jobs;
    assign a unique priority, from highest priority to lowest priority, to each of the plurality of jobs in the arranged order of the plurality of jobs, wherein each assigned unique priority is different from any other of the assigned unique priorities; and
    queue the execution of the plurality of jobs from highest priority to lowest priority based on the arranged order and the assigned unique priorities of the plurality of jobs.

11. The computerized system of claim 10, wherein to queue the execution of the plurality of jobs, the processor is to:
  determine, for each of the plurality of jobs in the assigned order starting with the job with the highest priority, whether there is sufficient memory in the first memory storage device to execute each of the plurality of jobs based on the determined memory requirement of each job; and then
  execute a first job of the plurality of jobs, placing the first job in a waiting queue of the processor until there is sufficient memory in the first memory storage device to execute the first job.

12. The computerized system of claim 10, wherein to queue the execution of the plurality of jobs, the processor is to:
  allocate memory in the first memory storage device to execute the plurality of jobs such that the memory is allocated to each of the plurality of jobs in the assigned order, wherein the first job with the highest priority is first allocated with the memory; and
  determine whether a remainder of the memory in the first memory storage device after the first allocation is sufficient to execute one or more remaining ones of the plurality of jobs.

13. The computerized system of claim 12, wherein the processor is to execute the first job once the memory is first allocated and release the memory once the first job is completed such that the memory is available for the remainder of the plurality of jobs with the second job with the second highest priority given a next allocation of the memory.

14. The computerized system of claim 10, wherein the processor is to arrange the plurality of jobs in an order of the memory requirements of the plurality of jobs by arranging the job with the largest memory requirement on one end of the arranged order and the job with the smallest requirement on the other end of the arranged order.

15. The computerized system of claim 10, wherein the processor is to assign the unique priority to each of the plurality of jobs by assigning the highest priority to the job with the largest memory requirement and the lowest priority to the job with the smallest memory requirement.

16. The computerized system of claim 10, wherein the plurality of jobs comprise a plurality of queries to an electronic database.

17. The computerized system of claim 16, wherein the computerized system includes the electronic database.

18. A non-transitory computer readable medium encoded with programming code executed by a computer processor to:
  receive the workload, wherein the workload includes a plurality of jobs;
  determine a memory requirement to execute each of the plurality of jobs;
  arrange the plurality of jobs in an order of the memory requirements of the plurality of jobs such that the job with the largest memory requirement is at one end of the order and the job with the smallest memory requirement is at the other end of the order;
  assign a unique priority to each of the plurality of jobs in accordance with the arranged order such that the job with the largest memory requirement is assigned the highest priority for execution and the job with the smallest memory requirement is assigned the lowest priority for execution, wherein each assigned unique priority is different from any other of the assigned unique priorities; and
  execute the workload in accordance with the arranged order of the plurality of jobs and the unique priority assigned to each of the plurality of jobs, from highest priority to lowest priority.

19. The non-transitory computer readable medium of claim 18, wherein the programming code to receive the workload comprises programming code to:
  receive the workload as one of a plurality of batches of jobs divided from a larger workload.

20. The non-transitory computer readable medium of claim 18, wherein the programming code to execute the workload comprises programming code to:
  concurrently initiate execution of the plurality of jobs; and
  determine, in the arranged order of the plurality of jobs, whether there is available memory to execute each of the plurality of jobs based on the memory requirement of each job.

* * * * *